April 8, 1930.  C. M. TERRY  1,753,728
REGULATING APPARATUS
Filed Jan. 5, 1928
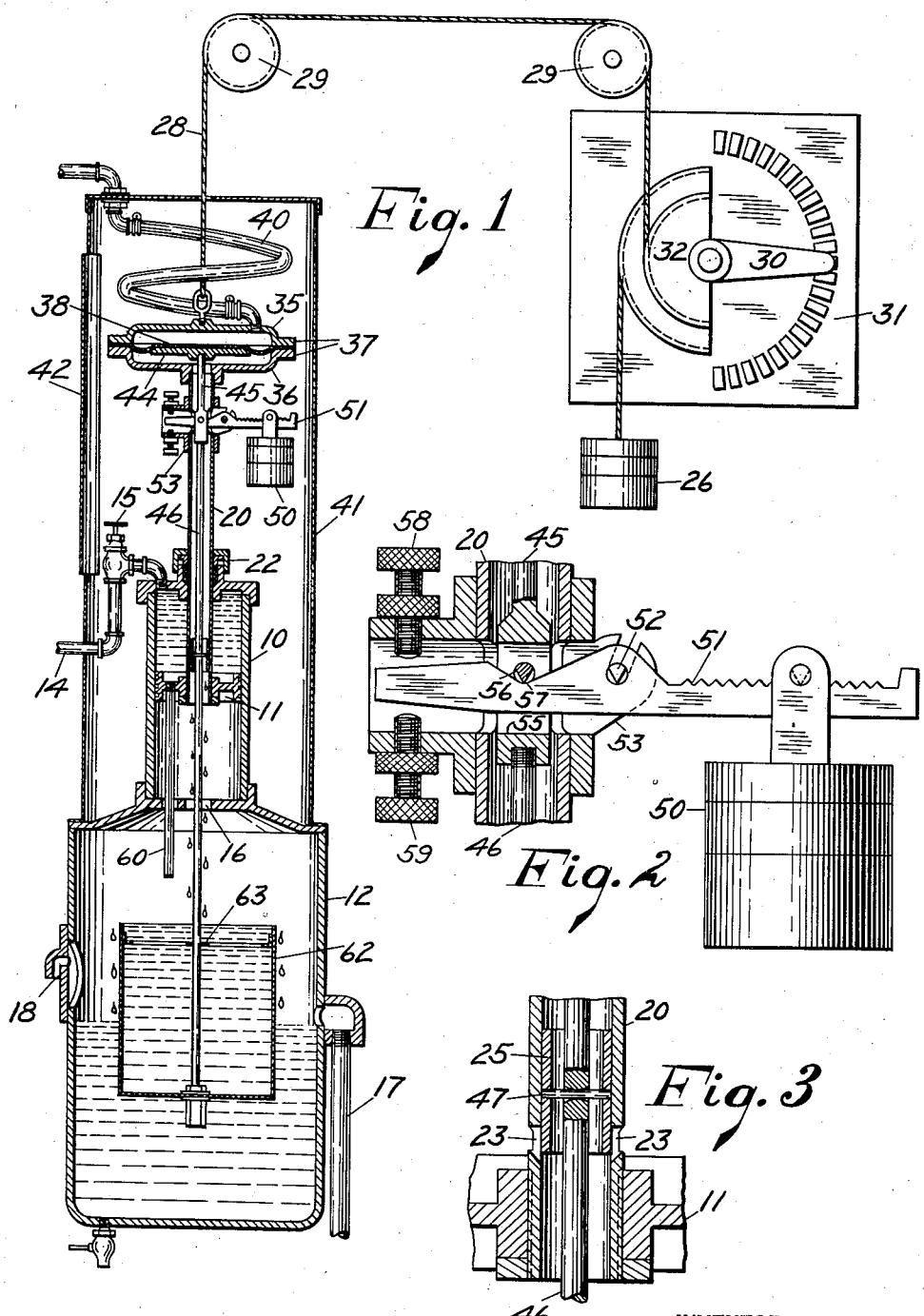
WITNESSES
A. G. Blodgett
E. H. Peterson
INVENTOR
CHARLES M. TERRY
BY
Clayton R. Jenks
ATTORNEY Patented Apr. 8, 1930

1,753,728

UNITED STATES PATENT OFFICE

CHARLES M. TERRY, OF DECATUR, ILLINOIS, ASSIGNOR TO A. W. CASH COMPANY, OF DECATUR, ILLINOIS, A CORPORATION OF DELAWARE

REGULATING APPARATUS

Application filed January 5, 1928. Serial No. 244,651.

My invention relates to regulating apparatus and more particularly to a fluid operated motor which is controlled in its movements by means of a pressure responsive device.

It is often desirable to maintain a constant pressure of gas at a given place, such as in the main duct which supplies air to a number of stokers or fuel burners. If the demand for air in one of the furnaces increases, this will tend to cause a drop in pressure in the main duct supplying air thereto, and thus seriously affect the operation of all of the furnaces on the line, unless the air pressure is maintained substantially constant.

It is one object of this invention to provide a suitable apparatus which is serviceable to regulate the operation of an exterior device in accordance with variations in movement of a pressure responsive device, and specifically to regulate the operation of a control member, such as the control of a motor driven fan or a damper in an air duct, in order that the pressure of the gas within a duct may be maintained substantially constant.

A further feature of the invention contemplates the provision of regulating apparatus which will serve to regulate variably the operation of one device in accordance with variations in pressure in a pressure responsive device. For example, if the pressure of the combustible gas in a main leading to a gas burner varies, then it is desirable that the pressure and amount of air mixed with the gas be varied similarly so as to maintain the proper ratio for perfect combustion. In such a case it may be desirable to regulate a damper in the air main or to regulate the controlling mechanism of a motor operated fan which determines the air pressure delivered to the burner so that if more combustible gas flows to the burner, the device will operate automatically to feed more air for mixing with the gas.

It is accordingly a further object of my invention to provide a compensated regulating device including a fluid pressure operated motor connected to an exterior control member which will vary the position of the control member in accordance with variations in pressure in a primary gas main.

A further object of the invention is to provide an efficient and simple form of regulating apparatus which operates positively and accurately and is sensitive to minute variations in pressure in a gas main, and which is so constructed that it may be adapted either to maintain constant conditions in a given piece of apparatus, as determined by the gas pressure in a given duct, or to vary the operation of a controlled device as the gas pressure in its duct fluctuates.

Referring to the drawings which illustrate one embodiment of my invention and in which like reference numerals indicate like parts.

Fig. 1 is a vertical section of a regulating apparatus connected to a suitable control device shown diagrammatically as a rheostat.

Fig. 2 is an enlarged detail view in section of the counter-balancing weighted lever; and Fig. 3 is an enlarged section detail of the valve mechanism.

In accordance with one embodiment of my invention I have provided a fluid pressure operated motor having a movable member arranged to vary the position of an exterior control device. The motor may comprise a piston suitably connected to the exterior control device, such as a rheostat, and in order that the piston may be moved to various positions and thereby move the rheostat control member accordingly, I employ a pressure responsive device including a diaphragm which is subjected to variations in pressure in a gas main, or the like and an adjustable counter-balance opposing movement of the diaphragm. A valve mechanism is so arranged and constructed that fluid under pressure is admitted to the hydraulic motor in accordance with variations in pressure in said duct, this being accomplished by mechanically connecting the valve with the diaphragm of the pressure responsive device. In so far as thus broadly described, this device may be utilized to maintain constant conditions in a given locality, such as to maintain a uniform pressure in a gas main. In such a case the rheostat may be electrically connected, for example, to the motor of a blower fan and the motor will be accelerated or retarded as the pressure in the gas main decreases or increases, respectively.

If it is desired to utilize the regulating apparatus to cause the operation of a device to vary in accordance with variations in the pressure of gas in a main, I may further add to this construction a compensating device which is so arranged that the movable member of the fluid pressure motor may be caused to stop in different predetermined positions in accordance with variations in the pressure responsive device. Such an arrangement might serve, for example, to increase the air pressure to a burner as the pressure of the combustible gas increases, and vice versa. One form of such compensating device, as herein illustrated, may comprise a member immersed to a variable distance in a liquid, and thereby having a variable weight, which is moved as a movable member of the hydraulic motor varies its position. This compensating device is so coordinated with the pressure responsive device and the valve mechanism that the valve operates to cause the movable member of the motor to assume a different predetermined position for each different pressure impressed on the pressure responsive device.

Referring more particularly to the drawings, I have there shown an apparatus which is complete for the latter described functions; namely, that of varying the operation of one member in accordance with variations of gas pressure in an outside gas main, but it will be understood that by omitting the compensating member from the apparatus, the functions and purpose of the apparatus will be changed and such will be fully within the scope of the present invention.

As illustrated in the drawings, the fluid pressure motor may comprise an ordinary cylinder 10 having a piston 11 movable therein under hydraulic pressure, these parts being arranged vertically on a container 12 adapted to hold a fluid. Various types of valve mechanisms may be employed within the scope of my invention to control the admission of fluid to the piston chamber, but as illustrated I have utilized that type of hydraulic motor and valve mechanism shown in my prior Patent #1,596,031 of August 17, 1926. As there illustrated, the piston in the hydraulic motor may be operated by means of a suitable fluid, such as water or oil, which is admitted to the upper side only of the piston within the cylinder chamber through an inlet pipe 14 controlled by a suitable hand valve 15, and the fluid which escapes from this cylinder is permitted to pass through an opening 16 in the bottom of the cylinder into the container 12 and is then discharged through a constant level overflow pipe 17. A vent 18 is provided in the wall of the container so as to maintain atmospheric pressure therein. The valve mechanism illustrated comprises a hollow tube 20, which is attached to the central portion of the piston and forms the piston rod. This tube communicates at its open end with the space beneath the piston, and extends through a suitable stuffing box 22 to a point above the top of the cylinder 10. Openings 23 in the tube 20 located just above the piston serve to permit the discharge of fluid from the chamber above the piston, and the flow of fluid through these openings is regulated by means of a sliding sleeve valve 25 which fits accurately the interior wall of the tube and is adapted to move up and down either to close off these openings entirely or to permit fluid to escape therethrough.

In so far as described, it will be seen that if the valve sleeve 25 is so positioned as to open the ports 23 slightly, then the fluid admitted through the pipe 14 may escape from the cylinder to the container 12 at the same rate at which it enters and the position of the piston is not disturbed. If now the valve sleeve 25 is moved downwardly to close these openings, then the pressure of the incoming fluid will move the piston downwardly. The piston may be moved upwardly by a suitable external force which is herein illustrated as a weight 26 suitably connected to the piston. In the present case this involves a cable 28 connected to the upper end of the piston rod 20 and passing over suitable sheaves 29 to operate a control device, illustrated as the contact arm 30 of a rheostat 31. The weight 26 as well as the cable 28 are both connected to a half sheave 32 which is formed as a part of the contact member 30, all as will be clearly understood by reference to the drawings. The rheostat 31 is adapted to be connected to suitable electrical mechanism to control some exterior device, such as an electric motor driving a fan to force air into a gas burner. The position of the piston in its motor chamber will therefore determine the position of the contact member 30 and will accordingly control the operation of the electric motor driven fan.

The movement of the piston is controlled by the position of the valve and the latter is in turn operated by a suitable pressure responsive device. In the present instance, the pressure responsive device comprises a diaphragm chamber of suitable construction which is shown as formed by two concave plates 35 and 36 having peripheral flanges 37 clamping a flexible diaphragm 38 therebetween. Pressure from a gas main is admitted to the pressure chamber above the diaphragm through a suitable pipe, such as the flexible tube 40, which passes through a coupling in the top of the casing 41 surrounding the apparatus. A door 42 permits access to the interior of the casing. A pressure plate 44 resting against the underside of the diaphragm is connected to a valve operating rod 45. This rod 45 is connected to a further rod 46, as shown in Fig. 2, and the rod 46 is connected by a cross pin 47 to the valve sleeve 25 as is clearly shown in Fig. 3.

The pressure responsive device includes a suitable counter-balancing member adapted to resist the pressure on the diaphragm in the pressure chamber. This comprises an adjustable weight 50 mounted on a lever arm 51 fulcrumed at 52 in a bracket 53 mounted on the tube 20, as shown in Fig. 2. The lower end of the rod 45 has an enlarged slotted portion 55 and the knife edge 56 is fastened to the opposite walls of the slot in this enlarged portion in such a manner as to rest in a groove 57 in the lever arm 51. It will therefore be seen that by adjusting the position of the weight along the bar 51 the counterbalancing pressure on the diaphragm 38 may be varied and the operation of the valve 25 will be accordingly affected. The rod 46 is screw threaded into the lower portion of the enlarged part 55 of the rod 45. Adjustable screws 58 and 59 are mounted in the bracket 53 to contact with the lever 51 in its extreme positions and thereby limit the movement of the valve.

It will now be understood that, in so far as described, the device may be used to maintain a substantially constant pressure in the gas duct 40. An excess of pressure in the pressure chamber will move the diaphragm 38 downwardly against the counter-balancing force of the weight 50 and so move the valve 25 downwardly thus tending to close the ports 23 and causing an increase of pressure in the motor chamber and thereby forcing the piston downwardly and so changing the position of the rheostat arm 30. The piston will move downwardly until the changed position of the rheostat arm 30 will cause such external conditions as to restore the pressure in the duct 40 and permit the weight 50 to return the valve operating rod 46 upwardly and so open the valve and permit the fluid to escape from the hydraulic cylinder.

It will be observed that the pressure responsive device is mounted on and carried solely by the piston rod 20. This permits the valve to move with the piston and retain a certain position relative thereto as desired and yet be controlled by the pressure responsive device. The piston is prevented from turning within its chamber by means of the rod 60 suitably secured to the piston, as by being screw threaded thereto, and slidably passing through an opening in the bottom of the motor casing.

If it is desired to utilize this apparatus so as to vary the position of an exterior control member, in accordance with variations in the gas pressure admitted to the pressure responsive device without attempting to control the gas pressure, then I employ a compensating device which operates to permit the piston 11 to come to a rest in a different position for each different pressure impressed on the diaphragm 38. This compensating device comprises a body which moves with the piston and which is arranged to be immersed to a variable distance in a body of liquid, thereby varying its effective weight and consequently the force which it exerts on the pressure responsive device connected thereto. The compensator has been shown in the drawings as made up of a body connected to the diaphragm in such a manner as to exert a downward force on it. The form illustrated comprises simply a bucket 62 secured on the lower end of the rod 46 and supported in position by a plate 63 fastened to the rod 46 and engaging the inner wall of the bucket as illustrated, this plate being perforated to permit the passage of fluid therethrough. As will be understood by reference to the drawings, the bucket is located beneath the piston and in such a position that liquid flowing through the valve ports 23 will drop into the bucket and keep the same full so that its weight is constant although the force which it applies to the pressure responsive diaphragm varies in accordance with its degree of immersion. The addition of this compensating feature changes the operation of the device materially. It will be understood that the pressure responsive device including the diaphragm pushed downwardly by pressure admitted to the chamber thereabove is counterbalanced to a certain extent by the weight 50 and in the form illustrated the weight of the bucket 62 is added to the pressure in the pressure chamber tending to move the valve downwardly against the upwardly acting force of the weight 50. If now the pressure increases in the pressure chamber above the diaphragm 38 and so moves the valve 25 downwardly that causes the ports 23 to be partially closed and the piston will move downwardly accordingly. This piston carries the compensating bucket 62 lowering it into the fluid in the chamber 12 and thereby decreasing the effective weight of the bucket. This decrease of effective weight reduces the downward pressure on the diaphragm and permits the weight 50 to lift the valve 25 relative to the downwardly moving piston and so open the ports 23 to such an extent as to permit fluid to escape from the piston chamber at such a rate as to maintain the piston in the new position provided the pressure on the diaphragm 38 does not change. This serves to move the control arm 30 of the rheostat to a new position and thus alter the exterior controlled apparatus accordingly. If the pressure in the chamber above the diaphragm 38 decreases then the weight 50 pulls the valve upwardly and releases more fluid from the motor chamber and permits the weight 26 to move the piston and the parts supported thereby upwardly to such an extent as to cause the valve to close slightly and so bring the piston to rest in a new position and accordingly move the control arm 30 to a new position. The control arm 30 will thus assume a definite position for each pressure impressed upon the diaphragm within the range of operation of the device.

Having thus described my invention, what I claim as new and desire to secure by Letters Patent is:—

1. A regulating apparatus comprising a fluid operated motor having a cylinder and a piston, one of which is movable relative to the other, means for connecting the movable member to an exterior control device, a valve mechanism effective to control the fluid pressure in the cylinder, a chamber movable with and fixed to the movable member of the fluid motor, and a pressure responsive member in said chamber which is connected to the valve mechanism to operate the same so that any change in pressure in said chamber will result in a movement of the piston.

2. A regulating mechanism comprising a fluid operated motor having a piston and cylinder, one of which is movable relative to the other, means for connecting the movable member to a control device, a valve mechanism constructed and arranged to control the fluid pressure in the cylinder, a chamber supported on the piston, and a pressure responsive member mounted in said chamber and connected to the valve mechanism to operate the valve as the pressure in said chamber varies.

3. A regulating apparatus comprising a fluid operated motor having a piston and a cylinder, one of which is movable relative to the other, means for connecting the movable member to a control device, means including a valve mechanism constructed and arranged to control the fluid pressure in the cylinder, a chamber supported on the piston, and a flexible pressure responsive diaphragm mounted in said chamber and connected to the valve mechanism to operate the same as the pressure in said chamber varies.

4. A regulating mechanism comprising a cylinder and a fluid operated piston therein, means for connecting the piston to a control device, mechanism, including a valve, to control the fluid pressure on one side only of the piston, a pressure responsive device movable with the piston, means connecting the pressure responsive device to the valve, and a flexible connection for conveying fluid under pressure from an external source to the pressure responsive device for any position of the latter.

5. A regulating apparatus comprising a cylinder, a fluid pressure operated piston therein, a piston rod connected to the piston and effective to operate an exterior control device, a valve mechanism effective to control the fluid pressure on the piston, a chamber mounted on the piston rod and movable therewith, a pressure responsive member in said chamber, and connections between the pressure responsive member and the valve mechanism, whereby any change in pressure in said chamber will move the valve mechanism and thus cause movement of the piston.

6. A regulating apparatus comprising a cylinder, a fluid pressure operated piston therein, an exterior control device connected to the piston and operated thereby, a valve mechanism effective to control the movements of the piston, a pressure responsive diaphragm movable with the piston, and connections between the diaphragm and the valve mechanism, said parts being so constructed and arranged that a change in pressure on said diaphragm will operate the valve mechanism and thus cause movement of the piston.

7. A regulating apparatus comprising a cylinder, a fluid pressure operated piston therein, a hollow piston rod connected to the piston and arranged to operate an exterior control device, a valve adjacent to said piston to control the movements thereof, a pressure responsive device including a flexible diaphragm mounted upon said piston rod, connections through the interior of the piston rod between the diaphragm and the valve, and a weighted lever mounted on said piston rod to oppose the pressure on said diaphragm, said parts being so constructed and arranged that a change in pressure on said diaphragm will move the the valve and thus cause movement of the piston.

8. A regulating apparatus comprising a cylinder and a piston therein connected to operate an outside control device, mechanism including a reciprocating valve arranged to control the fluid pressure in the cylinder, a pressure responsive device including a diaphragm, and a direct connection between the diaphragm and valve which is normal to the diaphragm and movable in the line of movement of said reciprocating valve, said parts being so constructed and arranged that a change in pressure on said diaphragm will move the valve and thus cause movement of the piston.

9. A regulating apparatus comprising a cylinder, a piston slidable therein and connected to operate an exterior control device, means to admit fluid under pressure to the cylinder to move the piston in one direction only, means to move the piston in the opposite direction, a valve constructed and arranged to control the discharge of fluid from the cylinder and thus vary the fluid pressure therein, a pressure responsive diaphragm, and means connecting the diaphragm with the valve, whereby a change in pressure on said diaphragm will move said valve and thus cause a movement of said piston.

10. A regulating apparatus comprising a fluid pressure operated piston effective to move an exterior control device from one position to another, a valve mechanism to control the fluid pressure which operates the piston, a pressure responsive device movable with the piston and serving to operate the valve, and a compensating device moved by the piston which tends to control the valve and stop the movement of the piston.

11. A regulating apparatus comprising a fluid pressure cylinder, a piston movable therein and adapted to operate an exterior control device, means including a valve connected to control the fluid pressure in said cylinder, a pressure responsive member connected to move said valve in accordance with variations in pressure in a gas pipe, and a compensating device which is connected to the valve and tends to counteract the movement thereof by the pressure responsive member and to hold the piston in a given new position in accordance with the new pressure affecting the member, said compensating device including a member connected to move with the piston and which is immersed in liquid to a variable distance by the piston.

12. A regulating apparatus comprising a fluid pressure operated motor having a piston adapted to control an exterior device, means including a valve adapted to control the fluid pressure in said motor, a pressure responsive device having a diaphragm connected to move the valve, and a compensating device including a receptacle for a liquid and a member connected to said valve and diaphragm which is arranged to move with said piston and be immersed to a variable distance in said liquid in accordance with the position of the piston, said parts being so constructed and arranged that movement of the piston tending to change the position of the compensating member in the liquid will automatically tend to move the valve so as to stop further movement of the piston.

13. A regulating apparatus comprising a hydraulic motor including a vertically arranged cylinder having means for admitting fluid under pressure to the motor, a piston in said cylinder, a valve for controlling the fluid pressure in the cylinder, a pressure responsive device including a diaphragm movable bodily with the piston, a reciprocable valve operating member connecting the valve with the diaphragm, and a compensating device, including a liquid container and a member movable with the piston and connected with said valve operating member, which is immersed to a variable distance in the liquid in accordance with the position of the piston, said pressure responsive device, valve and compensating device being so coordinated as to cause the piston to assume different positions for each given pressure impressed on the pressure responsive device.

14. A regulating apparatus comprising a fluid operated motor having a vertically reciprocable piston therein connected to an exterior regulatable member, a pressure responsive device, including a diaphragm, which is supported on and movable with said piston, means including a valve adapted to control the fluid pressure in said motor, a reciprocable connection between the diaphragm and said valve to operate the latter, and a compensating mechanism including a member movable with said piston and connected to the reciprocable connection, and a container for fluid in which the compensating member may be immersed to a variable distance, said parts cooperating to cause the piston to stop in a predetermined position in accordance with the pressure impressed on said diaphragm.

15. A regulating apparatus comprising a hydraulic motor having a reciprocable piston therein operatively connected to an exterior regulating device, means to admit fluid under pressure to the motor so as to move the piston, in one direction only, means to move the piston in the opposite direction, means including a reciprocable valve to control the fluid pressure in the motor, a pressure responsive device, including a diaphragm, which is movable with the piston, a compensating device including a fluid container and a member immersible to a variable distance in the fluid, and connections between the diaphragm, the valve and said compensating device reciprocable in a straight line, said parts being so constructed and arranged that any variation in the depth of immersion of the compensating member will affect the control of the valve position by the diaphragm and so cause the piston to assume a given position for each given pressure impressed upon the diaphragm.

Signed at Decatur, Illinois, this 31st day of December, 1927.

CHARLES M. TERRY.